United States Patent [19]

Howard et al.

[11] Patent Number: 5,066,552

[45] Date of Patent: Nov. 19, 1991

[54] LOW NOISE THIN FILM METAL ALLOY MAGNETIC RECORDING DISK

[75] Inventors: James K. Howard, Morgan Hill; Randall G. Simmons; Tadashi Yogi, both of San Jose, all of Calif.

[73] Assignee: International Business Machines Corporation, Armonk, N.Y.

[21] Appl. No.: 394,784

[22] Filed: Aug. 16, 1989

[51] Int. Cl.$^5$ .......................................... G11B 23/00
[52] U.S. Cl. ............................. 428/694; 204/192.2; 427/130; 427/132; 428/611; 428/639; 428/678; 428/900; 428/928
[58] Field of Search ............... 428/694, 900, 611, 678, 428/928, 639; 204/192.2; 427/130, 132

[56] References Cited

U.S. PATENT DOCUMENTS

| | | | |
|---|---|---|---|
| 4,385,098 | 5/1983 | Sugita et al. | 428/928 |
| 4,511,635 | 4/1985 | Nagao et al. | 428/900 |
| 4,550,062 | 10/1985 | Takayama et al. | 428/678 |
| 4,582,746 | 4/1986 | Shirahata et al. | 428/900 |
| 4,621,008 | 11/1986 | Takasugi et al. | 204/192.2 |
| 4,652,499 | 3/1987 | Howard | 428/641 |
| 4,711,810 | 12/1987 | Ando et al. | 428/900 |
| 4,774,130 | 9/1988 | Endo et al. | 204/192.2 |
| 4,789,598 | 12/1988 | Howard et al. | 204/192.2 |
| 4,803,130 | 2/1989 | Skorjanec et al. | 204/192.2 |
| 4,898,774 | 2/1990 | Yamashita et al. | 204/192.2 |

Primary Examiner—Paul J. Thibodeau
Attorney, Agent, or Firm—Thomas R. Berthold

[57] ABSTRACT

An improved CoPt alloy magnetic recording disk for horizontal recording has a magnetic recording layer which includes oxygen, the oxygen being present preferably in the range of approximately 5 to 30 atomic percent. The resulting disk structure has substantially decreased intrinsic media noise at high linear recording density.

8 Claims, 2 Drawing Sheets

Oxygen Content (at. %)

$Co_{17}Pt_6Cr_{17}/Cr$

LOW NOISE THIN FILM METAL ALLOY MAGNETIC RECORDING DISK

BACKGROUND OF THE INVENTION

1. Technical Field

This invention relates to thin film metal alloy magnetic recording disks for horizontal recording, and in particular to a CoPt alloy disk having low intrinsic media noise at high linear recording density.

2. Description of the Prior Art

One of the problems with thin film metal alloy media, including CoPt media, is that the intrinsic media noise increases with increasing linear recording density. Media noise arises from irregularities in the magnetic transitions and results in random shifts of the readback signal peaks. These random shifts are referred to as "peak jitter" or "time jitter". Thus, the higher the media noise, the higher the bit error rate. It is therefore desirable to develop a thin film metal alloy media which generates noise below a maximum acceptable level in order that data can be recorded at maximum linear density. The effect of intrinsic media noise, as measured by peak jitter and media signal-to-noise ratio (SNR), on the bit error rate in magnetic recording systems is described by Katz, et al., in "Effect of Bitshift Distribution on Error Rate in Magnetic Recording", *IEEE Trans. on Magnetics*, Vol. MAG-15, pp. 1050-1053, 1979. The measurement of media SNR is described by Belk, et al., in "Measurement of the Intrinsic Signal-to-Noise Ratio for High Performance Rigid Recording Media", *J. Appl. Physics*, 59(2), Jan. 15, 1986, pp. 557-562.

Assignee's U.S. Pat. No. 4,789,598 describes a cobalt-platinum-chromium (CoPtCr) alloy magnetic recording disk wherein the high Cr concentration reduces the intrinsic media noise at high recording density.

Japanese Kokai 61-276116 describes a cobalt-nickel (CoNi) alloy disk with high SNR. The disk substrate is alumite-coated and the CoNi magnetic film is sputter deposited in the presence of either oxygen or nitrogen, after which the disk is heat treated, resulting in a disk with 20 to 50 atomic percent oxygen or nitrogen present in the CoNi magnetic film.

Three additional references describe various cobalt alloy thin film disks which appear to have either oxygen or nitrogen incorporated into the magnetic films in various amounts, but without any teaching of deliberately introducing oxygen during sputtering for the purpose of improving the SNR of the magnetic films. For example, Japanese Kokai 61-142523 describes a CoPt disk wherein the magnetic film is sputtered in the presence of nitrogen and then heat treated to crystallize the film and drive off the nitrogen, resulting in a CoPt film containing 0.5 to 5 atomic percent nitrogen. Japanese Kokai 61-253622 describes a CoCrX (X=Pt, Rh, Re, Pd, Ir, etc.) alloy disk wherein up to 5 atomic percent oxygen or nitrogen may be present in the magnetic film. U.S. Pat. No. 4,749,459 to Yamashita describes a CoPt disk which is formed by introducing very small amounts of nitrogen or an oxygen-containing gas during sputter deposition of the magnetic film, for the express purpose of reducing the coercivity of the resulting CoPt film.

SUMMARY OF THE INVENTION

The invention is an improved CoPt alloy magnetic recording disk for horizontal recording wherein the magnetic recording layer in the disk includes oxygen in an amount greater than approximately 5 atomic percent, preferably in the range of approximately 5 to 30 atomic percent. The disk is formed by introducing oxygen into argon during the sputter deposition of the CoPt alloy magnetic layer. The resulting disk structure has an intrinsic media noise at high linear recording density which is substantially less than that for comparable disk structures formed under similar conditions but without the introduction of oxygen during the sputter deposition of the CoPt magnetic layer. The SNR can be improved even further if the disks are heat treated following the sputter deposition fabrication process.

For a fuller understanding of the nature and advantages of the present invention reference should be made to the following detailed description taken in conjunction with the accompanying drawings.

DESCRIPTION OF THE PREFERRED EMBODIMENTS

In order to illustrate the improved SNR for CoPt alloy disks with oxygen incorporated into the magnetic layer two CoPtCr disks were fabricated under identical conditions with the exception that oxygen was introduced during sputtering for one of the disks.

The disks were prepared in an RF-DC magnetron sputtering system (Varian S-gun). The base pressure was approximately $3 \times 10^{-7}$ Torr before deposition and was maintained at approximately 6 mTorr of Ar for each deposition. Power to the system was 500 Watts and the Ar flow rate was 40 sccm. All depositions were conducted without substrate heat. The substrates were $5\frac{1}{4}''$ AlMg/NiP disks. The surfaces of the substrates were RF discharge cleaned and Cr underlayers of 750 Angstroms thickness were formed over the NiP surface films. Magnetic layers having metal compositions of $Co_{77}Pt_6Cr_{17}$ were formed to a thickness of 160 Angstroms over the Cr underlayers. Thereafter protective carbon overcoats of 250 Angstroms thickness were formed over the CoPtCr magnetic layers. In one case oxygen was introduced into the sputtering chamber at a flow rate of approximately 5% of the Ar flow rate.

Figure 1:
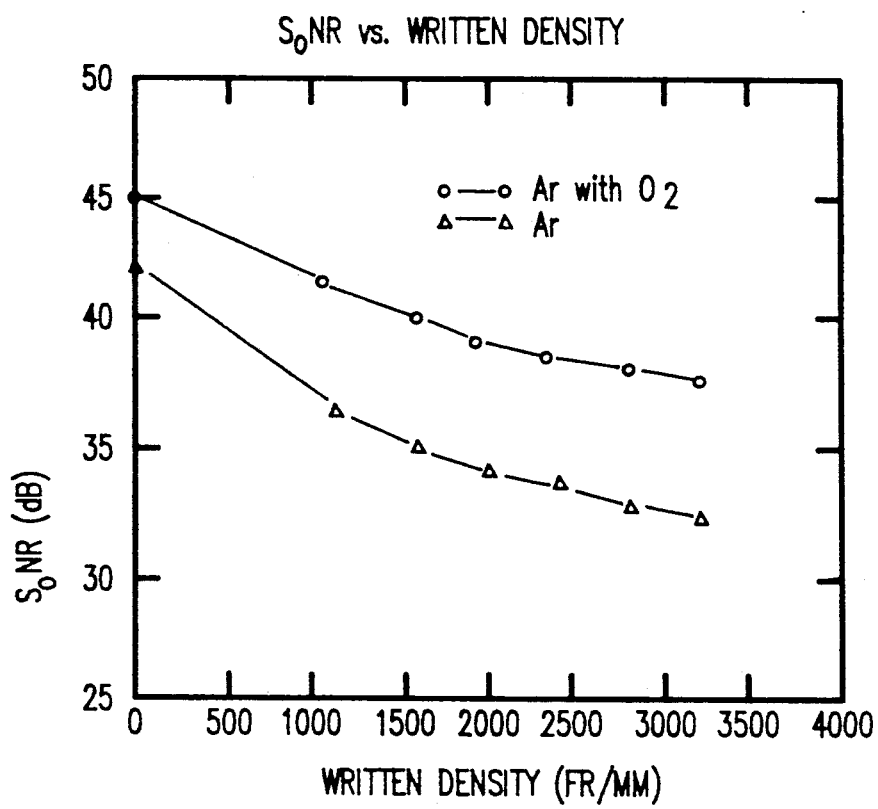
FIG. 1 is a comparison of $S_0NR$ versus linear recording density for CoPtCr disks made with and without the incorporation of oxygen into the magnetic layer.

The comparison of the intrinsic media noise for these two disks is graphically illustrated in FIG. 1. The SNR term of $S_0NR$ is defined as $20 \log(V_s/V_n)$, where $V_s$ is the isolated signal amplitude and $V_n$ is the integrated RMS noise of the media. The disk made with oxygen incorporated into the CoPtCr magnetic layer shows marked improvement in $S_0NR$ at all recording densities, with a 4.4 dB (38.5 dB vs. 34.1 dB) improvement at 2400 fr/mm.

Figure 2:
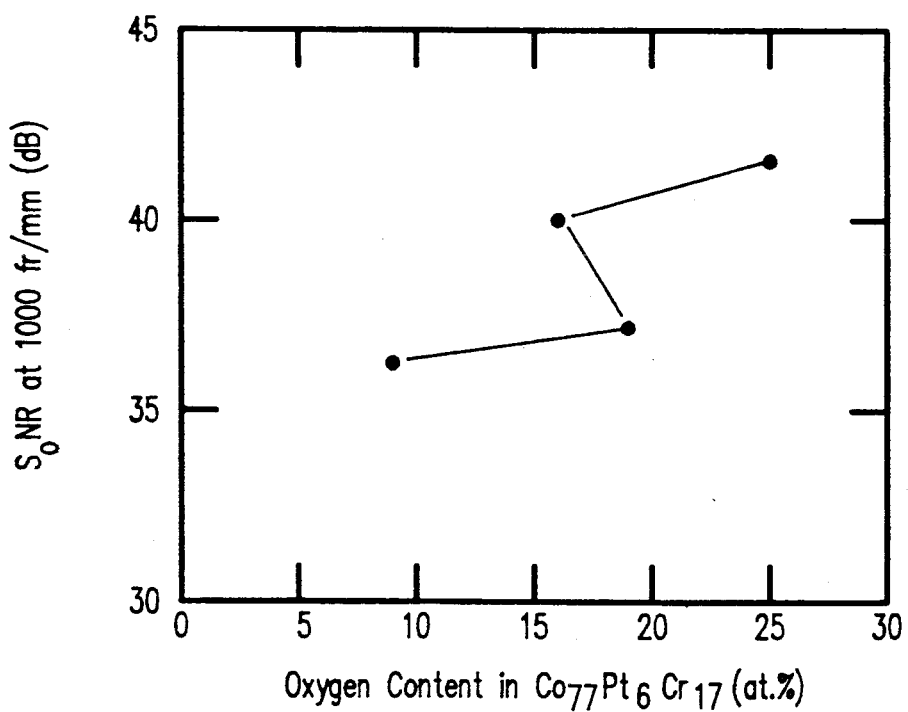
FIG. 2 is a plot of $S_0NR$ at 1000 flux reversals per millimeter (fr/mm) as a function of oxygen content in CoPtCr disks.
Figure 3A:
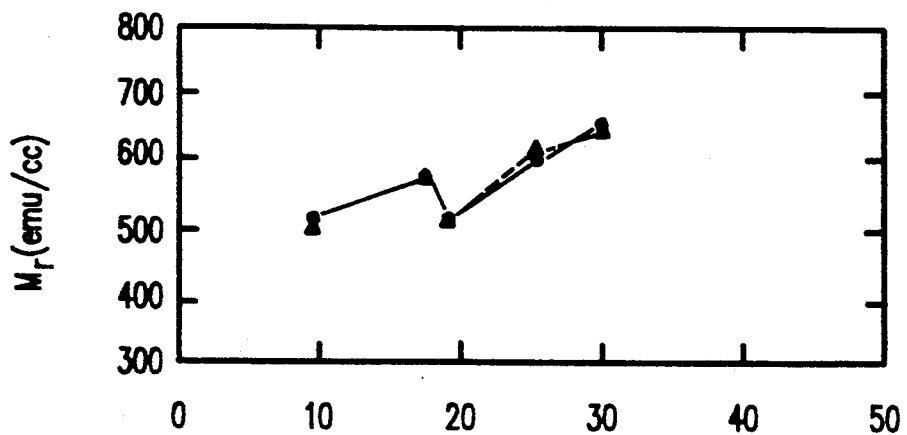
FIGS. 3A, 3B and 3C are graphs of remanence $M_r$, coercivity squareness $S^*$ and coercivity $H_c$, respectively, as a function of oxygen content in CoPtCr disks.
Figure 3B:
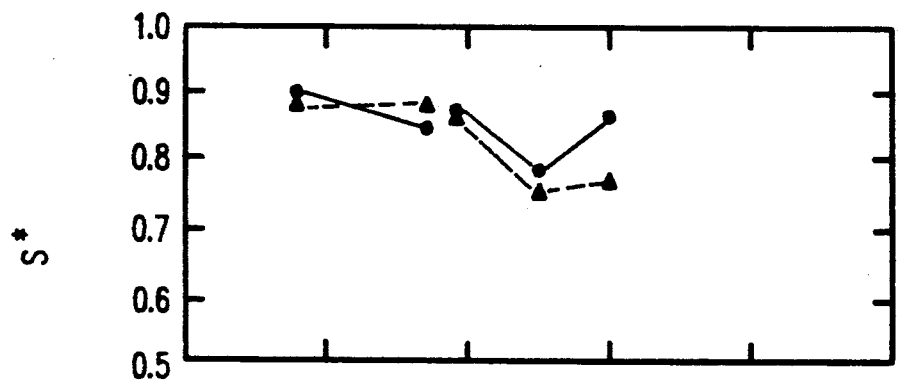
Figure 3C:
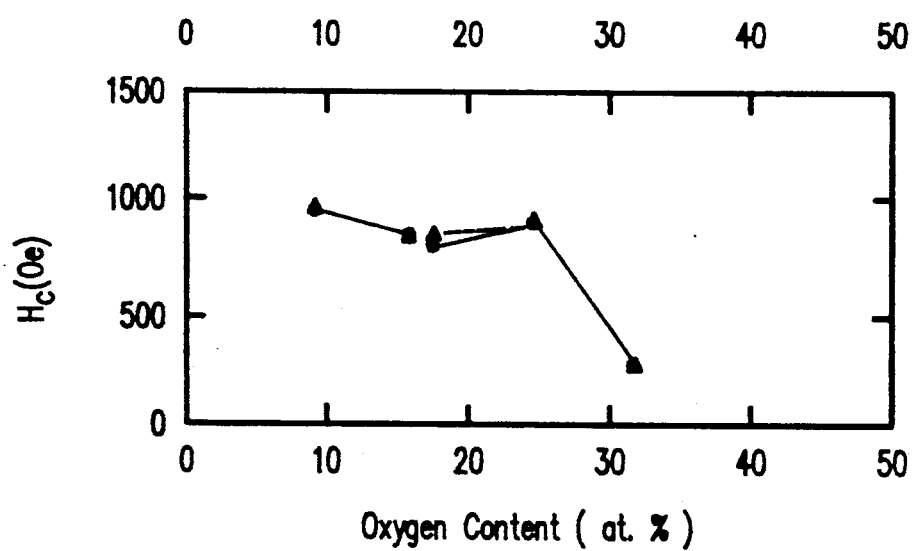

In order to determine the SNR dependence on the oxygen content of the magnetic layer, various disks were fabricated under sputtering conditions similar to those stated above but with different oxygen flow rates. The disk structures were also different than that for the disks stated above only in that the CoPtCr layers were 600 Angstroms thick and were formed over 1000 Angstroms thick Cr underlayers. Some of the disks were fabricated on semiconductor grade single crystal silicon in addition to polished AlMg/NiP with identical recording results. Since the surface of the silicon substrate is smooth and amorphous with a native oxide, the results described here are believed to be also applicable to glass or glass-ceramic substrates. The oxygen content was determined by Rutherford backscattering. The dependence of oxygen content on the SNR, as measured by $S_0NR$, is depicted graphically in FIG. 2. The dependence of other magnetic properties on the oxygen content for these disks is illustrated in FIGS. 3A, 3B and 3C. At approximately 30 atomic percent oxygen, the magnetic properties of the disks, especially the coercivity $H_c$, render the disks essentially unusable as magnetic recording media.

It has also been discovered that the SNR of CoPtCr disks formed in an oxygen-containing atmosphere can be improved even further if the completed disk is annealed. In one experiment disks with a $Co_{75}Pt_{12}Cr_{13}$ magnetic layer formed directly on a AlMg/NiP substrate were heated at 450 degrees F for 90 minutes and allowed to cool slowly to ambient temperature. The thermal treatment was conducted in both air and an essentially oxygen-free atmosphere created by first purging the oven with nitrogen. The resulting disks exhibited a decrease of 9.8 microvolts RMS noise and an increase of 3.6 dB SNR at 2400 fr/mm over identical disks which were not heat treated.

The above description relates only to the inventive structure which forms a part of the recording media, and not to the conventional well-known portions of the media and the media fabrication processes. For example, in the fabrication of thin film metal alloy disks, it is known to provide a protective overcoat, such as a sputtered carbon film, over the magnetic film.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A magnetic recording disk for horizontal recording comprising:
   a rigid substrate; and
   a sputter deposited magnetic layer formed over the substrate, the magnetic layer having a composition comprising cobalt, platinum and oxygen, the oxygen being present in the magnetic layer in an amount greater than approximately 5 atomic percent and less than approximately 30 atomic percent.

2. A disk according to claim 1 further comprising a non-magnetic underlayer between the substrate and the magnetic layer.

3. A disk according to claim 2 wherein the underlayer is chromium.

4. A disk according to claim 1 wherein the magnetic layer includes chromium.

5. A disk according to claim 1 further comprising a protective overcoat formed over the magnetic layer.

6. A magnetic recording disk for horizontal recording comprising:
   a rigid substrate;
   a sputter deposited magnetic layer formed over the substrate and having a composition comprising cobalt, platinum and oxygen, the oxygen being present in the magnetic layer in an amount greater than approximately 5 atomic percent and less than approximately 30 atomic percent; and
   a protective overcoat formed over the magnetic layer.

7. In a process for the fabrication of a thin film magnetic recording disk of the type having a magnetic layer comprising cobalt and platinum wherein the magnetic layer is formed by sputter deposition, an improvement comprising the steps of introducing oxygen into the sputtering atmosphere during the deposition of the magnetic layer in an amount sufficient to incorporate oxygen into the magnetic layer in an amount greater than approximately 5 atomic percent and less than approximately 30 atomic percent.

8. The improved process according to claim 7 further comprising the step of heat treating the disk after the sputter deposition of the magnetic layer.

* * * * *